US007623409B2

(12) United States Patent
Plunkett et al.

(10) Patent No.: US 7,623,409 B2
(45) Date of Patent: Nov. 24, 2009

(54) ARRAY PLATE APPARATUS HAVING TUNABLE ISOLATION CHARACTERISTICS

(75) Inventors: Stephen J. Plunkett, Middletown, RI (US); Neil J. Dubois, Cranston, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 290 days.

(21) Appl. No.: 11/768,221

(22) Filed: Jun. 26, 2007

(65) Prior Publication Data

US 2009/0000860 A1 Jan. 1, 2009

(51) Int. Cl.
*G01K 11/04* (2006.01)

(52) U.S. Cl. .......................................................... 367/1

(58) Field of Classification Search ..................... 367/1; 181/200; 114/341, 342
See application file for complete search history.

(56) References Cited

U.S. PATENT DOCUMENTS 4,004,266 A 1/1977 Cook et al.
4,192,246 A 3/1980 Hodges et al.
4,949,317 A 8/1990 McQuitty et al.
4,979,917 A * 12/1990 Haynes ........................ 440/38
5,426,619 A 6/1995 Madden et al.
5,428,582 A 6/1995 Madden et al.
5,905,693 A 5/1999 Dubois
5,992,077 A 11/1999 Dubois
2009/0000860 A1* 1/2009 Plunkett et al. ............. 181/200

FOREIGN PATENT DOCUMENTS

RU 2240605 C1 * 11/2004

* cited by examiner

*Primary Examiner*—Dan Pihulic
(74) *Attorney, Agent, or Firm*—James M. Kasischke; Michael P. Stanley; Jean-Paul A. Nasser

(57) ABSTRACT

An apparatus having an array plate and an isolation section joined to the perimetrical edge of the plate. The isolation section has a plurality of isolation layers and a plurality of intermediate layers alternately arranged wherein an intermediate layer is positioned between consecutive isolation layers. An innermost isolation layer is joined to the perimetrical edge of the array plate and an outermost isolation layer is adapted to be joined to a hull structure of an underwater vehicle. Each isolation layer is made from energy absorbing material and each intermediate layer is made from generally rigid material. The isolation section substantially reduces vehicle self-noise from traveling to the array plate. Interchangeable depth stop members having various geometries are used to adjust the stiffness of the isolation section so as to maximize the isolation characteristics of the isolation section at particular water depths at which the underwater vehicle operates.

12 Claims, 6 Drawing Sheets

ARRAY PLATE APPARATUS HAVING TUNABLE ISOLATION CHARACTERISTICS

STATEMENT OF GOVERNMENT INTEREST

The invention described herein may be manufactured and used by or for the Government of the United States of America for Governmental purposes without payment of any royalties thereon or therefore.

BACKGROUND OF THE INVENTION (1) Field of the Invention

The present invention generally relates to an array plate for use on underwater vehicles.

(2) Description of the Prior Art

Presently, underwater or undersea vehicles employ sonar arrays to find, localize, avoid, and classify underwater objects. Such vehicles typically use forward-looking sonar arrays that have acoustic transducers or other sensing elements attached to an array plate or baffle. The performance of these sonar arrays is often degraded by the self-noise generated by the underwater vehicle itself.

Typically, this self-noise is in the form of vibrations that are produced by the propulsion system of the underwater vehicle. The self-noise travels through the structure of the underwater vehicle and through the array plate to which are attached the acoustic transducers. As a result, the vehicle self-noise causes an increase in the noise floor and adversely affects the performance of the acoustic transducers.

In many operations, passive sonar arrays are used instead of active sonar systems. Passive sonar arrays use sensing elements, such as piezoelectric elements, to sense pressure fluctuations in the water which represent sound. However, the amplitude and power levels of acoustic signals detected by passive sonar arrays are very low; thus, the vehicle self-noise can significantly degrade the performance of the passive sonar array in the detection of such low-level acoustic signals. Active sonar array systems are also affected by vehicle self-noise.

In order to achieve improvement in the performance of the sonar array, isolation techniques have been used isolate the sonar array from the vehicle self-noise. A review of the prior art reveals several references that disclose a variety of array plate structures and noise-isolation configurations for use with acoustic transducers.

Cook et al. (U.S. Pat. No. 4,004,266) discloses a transducer array with low cross coupling. Each transducer is set in the recess of a steel baffle plate.

Hodges et al. (U.S. Pat. No. 4,192,246) discloses a torpedo nose section having an acoustic window and nose section interfacing with the main body of a torpedo at a position aft of acoustic transducers positioned in the nose section.

McQuitty et al. (U.S. Pat. No. 4,949,317) discloses a compliant baffle for attachment to a rigid transducer mounting plate. The baffle is coupled to one side of the plate and the transducers are coupled to the opposite side of the plate.

Madden et al. (U.S. Pat. No. 5,426,619) discloses a mounting arrangement for a sonar array. A three-layer plate is coupled to a steel plate by means of compliant material tubes. Transducers are mounted on one plate layer and Madden et al. (U.S. Pat. No. 5,428,582) discloses a decoupling ring that surrounds a sonar array and serves as the interface with the nose of an underwater vehicle.

Dubois (U.S. Pat. No. 5,905,693) discloses a vibration isolation mount for an acoustic device. The mount is constructed in “layers” with a rigid mount supporting the acoustic device, a compliant collar coupled to the rigid mount, and a rigid mount positioned between the other end of collar and the structure to which the mount is coupled.

Dubois (U.S. Pat. No. 5,992,077) discloses a multi-layered nose cone assembly for surrounding and shielding a sonar array mounted in the nose portion of an underwater vehicle.

Based on the prior art references, a need still exists for an improved isolation device that significantly reduces the magnitude of vehicle self-noise that reaches the array plate and the acoustic transducers.

SUMMARY OF THE INVENTION

It is therefore a primary object and general purpose of the present invention to provide an apparatus for use on an underwater vehicle in which the apparatus significantly reduces the amount of vehicle self-noise that travels to an array plate of the undersea vehicle.

It is a further object of the present invention to significantly reduce the noise floor at which acoustic transducers operate.

To attain the objects of the present invention, an apparatus is provided which includes an array plate having a perimetrical edge and an isolation section joined to the perimetrical edge. The array plate is configured to have acoustic transducers, such as hydrophones, attached thereto.

The isolation section breaks the transmission path of vehicle self-noise and isolates the acoustic transducers from such vehicle self-noise. The isolation section comprises a plurality of isolation layers and a plurality of intermediate layers arranged in an alternating configuration wherein an intermediate layer is positioned between consecutive isolation layers. The isolation layers comprise an innermost isolation layer that is joined to the perimetrical edge of the array plate and an outermost isolation layer for joining to a hull structure of an underwater vehicle.

Each isolation layer is fabricated from a flexible, energy absorbing material of a type known to those skilled in the art. In one embodiment, the flexible, energy absorbing material is elastomeric material. In another embodiment, the array plate and isolation section are annular in shape so as to allow use of the apparatus in underwater vehicles having an annular or circular cross-sectional shape. Interchangeable depth stop members having various geometries are used to adjust the stiffness of the isolation section so as to provide greater isolation at shallow depths while still providing deep depth operational capability.

Using depth stop members of various geometries allows relatively soft, energy absorbing materials to be used to form the isolation layers. Such relatively soft isolation layers facilitate significant isolation of the array plate from vibrations and other vehicle self-noise at shallow depths. Thus, the stiffness of the array plate is tunable or adjustable; thereby, allowing variation of the resonance and corresponding frequency at which maximum isolation occurs.

The apparatus of the present invention exhibits significant improvement in the isolation of acoustic transducers from relatively large deflections and also improves the noise floor at which the acoustic transducers operate. This results in a significant improvement in the quality of detected sonar signals.

BRIEF DESCRIPTION OF THE DRAWINGS

The features of the invention are believed to be novel. The figures are for illustration purposes only and are not drawn to scale. The invention itself, however, both as to organization and method of operation, may best be understood by reference to the detailed description which follows taken in conjunction with the accompanying drawings in which.

DETAILED DESCRIPTION OF THE INVENTION

Figure 1:
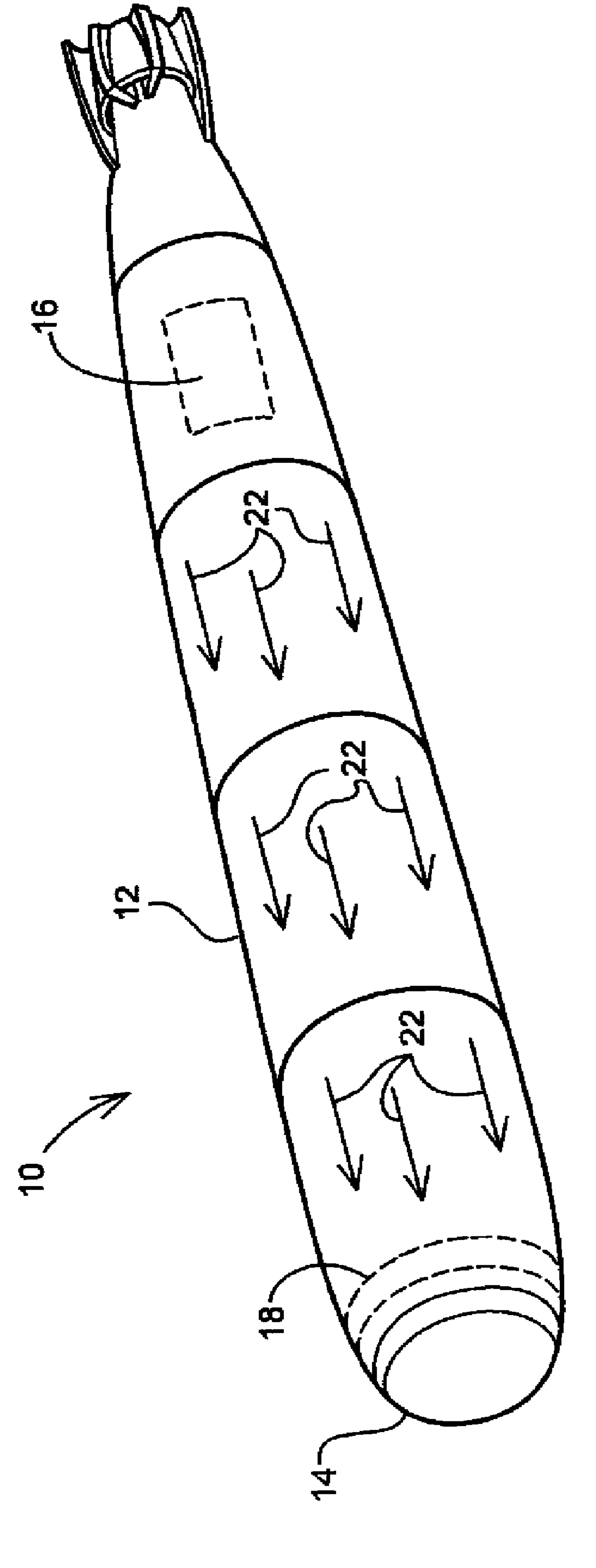
FIG. 1 (PRIOR ART)
FIG. 1 is a diagrammatical view of a torpedo in operation, the torpedo having incorporated therein a prior art array plate.
Figure 2:
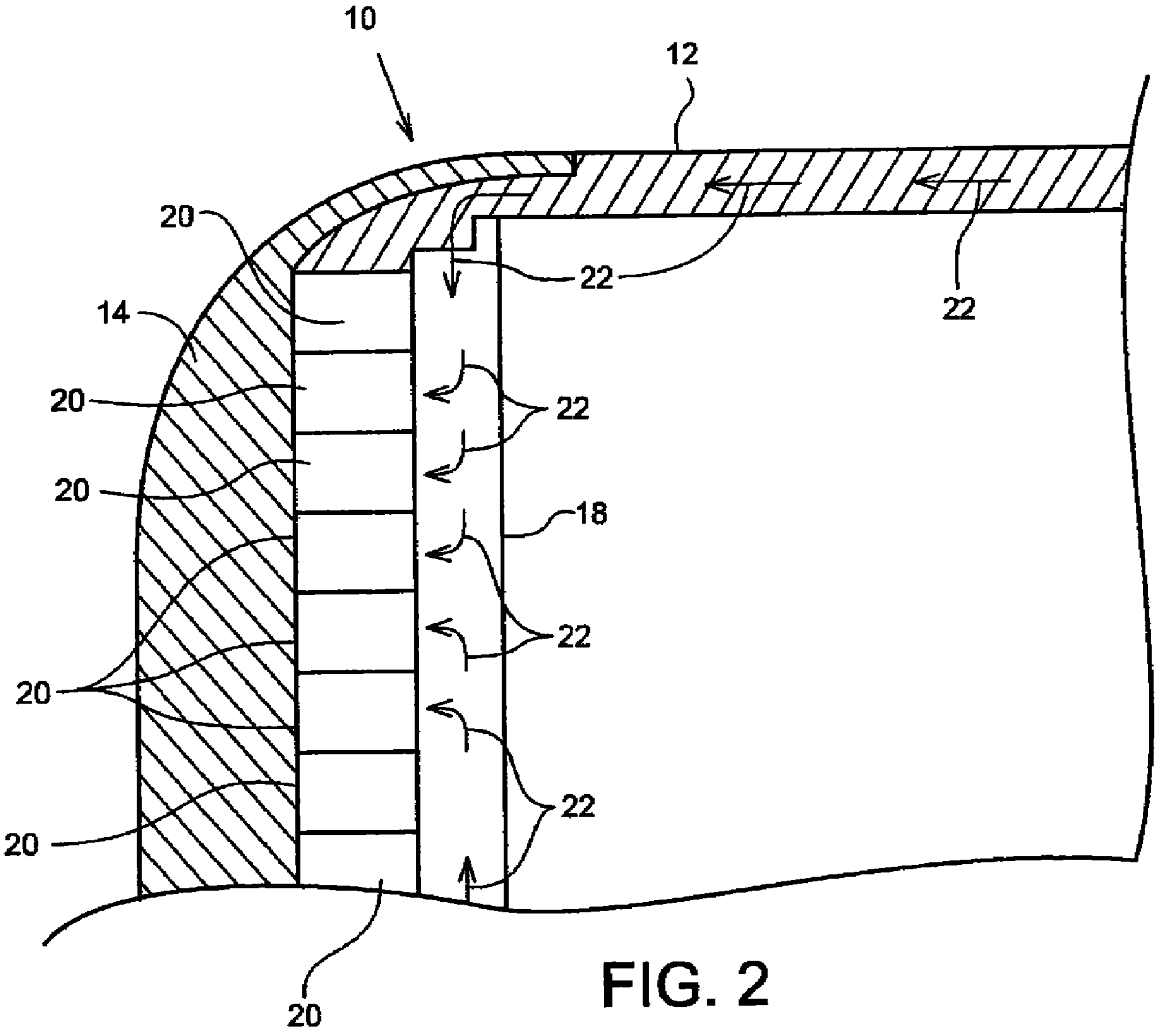
FIG. 2 (PRIOR ART)
FIG. 2 is a partial, sectional view of the torpedo of FIG. 1 showing the prior art array plate.

Referring now to the drawings in detail wherein like numerals indicate the elements throughout the several views, FIGS. 1 and 2 depict an underwater vehicle 10 that employs a prior art array plate. The underwater vehicle 10 generally comprises a structural shell 12, a nose section 14 and a propulsion system 16 (shown in phantom). The structural shell 12 extends to the nose section 14. In this particular example, the underwater vehicle 10 is configured as a torpedo. The underwater vehicle 10 uses a prior art array plate 18 (shown in phantom in FIG. 1), which is adjacent to the nose section 14.

Acoustic transducers 20 are attached to the array plate 18. The acoustic transducers 20 are typically hydrophones or other acoustic energy sensing elements known in the art. The propulsion system 16 is the main source of the underwater vehicle self-noise which includes a substantial amount of energy due to vibrations. Other components and sub-systems on the underwater vehicle 10, such as the on-board electronics, can also contribute to the generation of vehicle self-noise. Vehicle self-noise emanating from all sources is indicated by arrows 22. The structural shell 12 and the inner hull structure of the underwater vehicle 10 act as a conduit or path that allows the vehicle self-noise 22 to travel the array plate 18 and the acoustic transducers 20. The acoustic transducers 20 detect vehicle the self-noise 22 and convert the detected noise into voltage signals. These voltage signals increase the noise floor and degrade the performance of the acoustic transducers 20.

Figure 3:
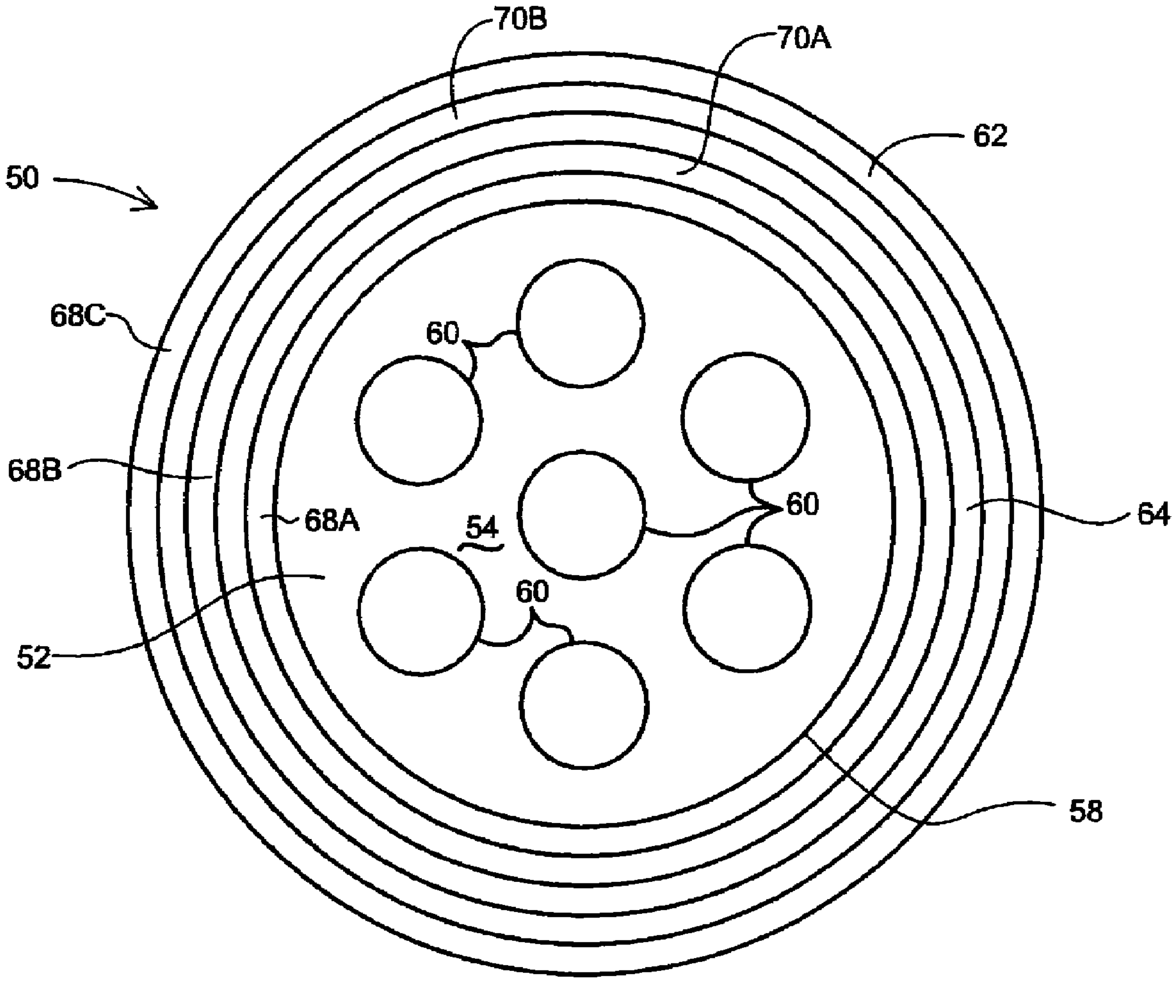
FIG. 3 is a front, elevational view of the apparatus of the present invention.

Referring now to FIG. 3, there is shown an apparatus 50 in accordance with a preferred embodiment of the present invention. The apparatus 50 is configured for use with an underwater vehicle. The apparatus 50 generally comprises an array plate 52, which has a front side 54, a rear side 56 (see FIG. 4) and a perimetrical edge 58. Acoustic transducers 60 are joined to the front side 54 using techniques and configurations known to those skilled in the art. In a preferred embodiment, the array plate 52 is fabricated from corrosion-resistant metals, e.g. carbon steel, aluminum, stainless steel, titanium, etc.

The apparatus 50 further comprises an isolation section 62 that is joined to the perimetrical edge 58 of the array plate 52. The isolation section 62 has a front side 64 that borders the front side 54 of the array plate 52 and a rear side 66 that borders the rear side 56 of the array plate (see FIG. 4). The isolation section 62 comprises a plurality of isolation layers 68A, 68B and 68C, and a plurality of intermediate layers 70A and 70B. The innermost isolation layer 68A is joined to the perimetrical edge 58 of the array plate 52. Preferably, the intermediate layers 70A and 70B are substantially rigid so as to provide structural integrity to the isolation section 62 and to allow for the use of multiple isolation layers.

Figure 4:
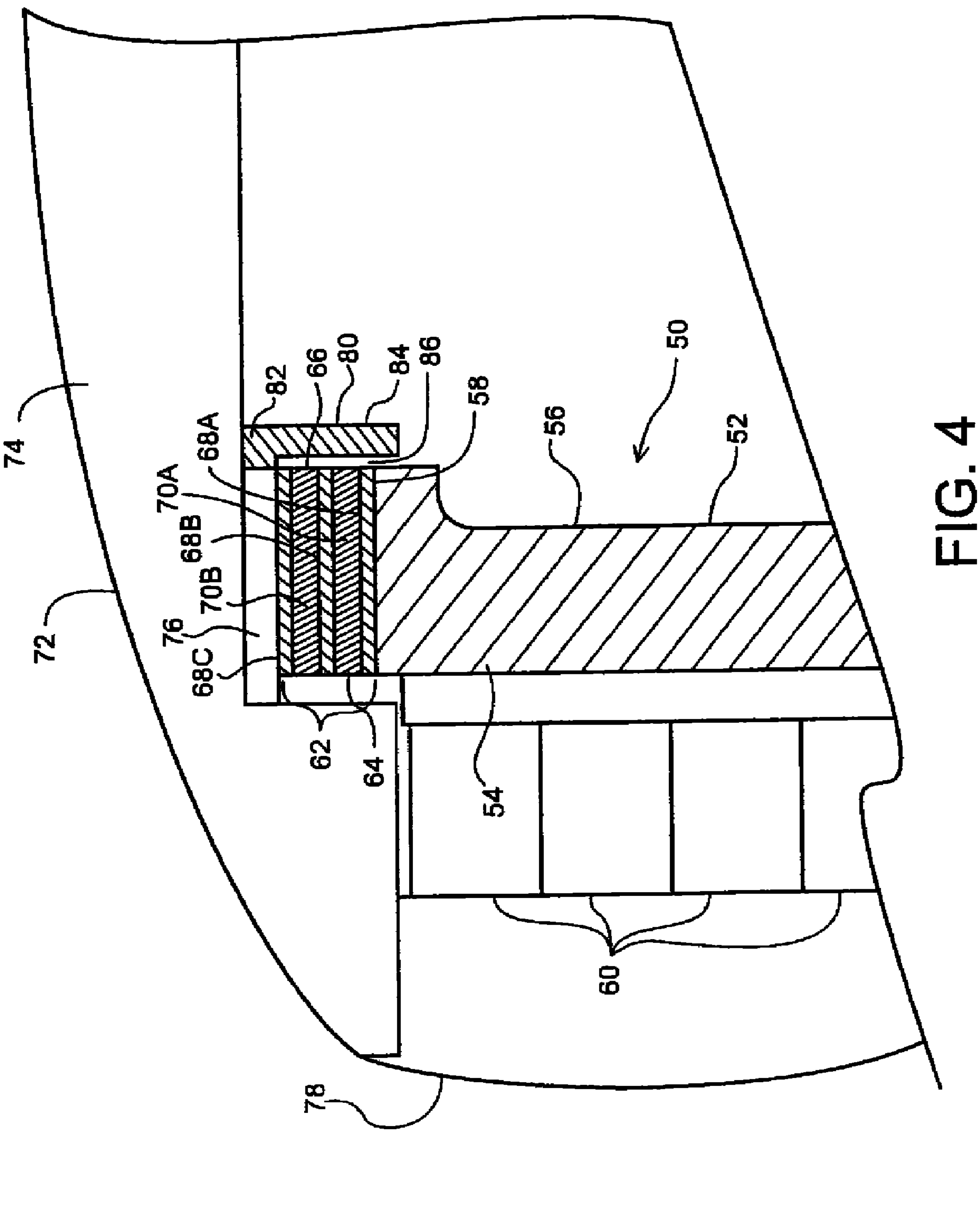
FIG. 4 is a partial, sectional view of the apparatus of FIG. 3 incorporated into an underwater vehicle.

As shown in FIGS. 3 and 4, the isolation layers 68A, 68B and 68C and intermediate layers 70A and 70B are positioned about the array plate 52 in an alternating arrangement wherein the intermediate layer 70A is positioned between the consecutively positioned isolation layers 68A and 68B, and the intermediate layer 70B is positioned between the consecutively positioned isolation layers 68B and 68C.

Each isolation layer 68A, 68B and 68C is fabricated from elastomeric, flexible material that has significant absorption properties, and significant strength to withstand high pressure at deep ocean or water depths. The aforesaid elastomeric, flexible material also has properties that facilitate potting the elastomeric, flexible material in place and adhering substrates thereto. In one embodiment, the aforesaid elastomeric, flexible material is polyurethane. The intermediate layers 70A and 70B are preferably fabricated from the same material used to fabricate the array plate 52 (e.g. aluminum, carbon steel, titanium, and stainless steel).

The innermost isolation layer 68A is adhered to the perimetrical edge 58 of the array plate 52 using adhesives known in the art. Similarly, the intermediate layer 70A is adhered to the isolation layers 68A and 68B and the intermediate layer 70B is adhered to the isolation layers 68B and 68C. The outermost isolation layer 68C is adhered to inner hull structure 76.

As shown in FIG. 4, the array plate apparatus 50 is used in the underwater vehicle 72. The underwater vehicle 72 has a structural shell 74, an inner hull structure 76 and a nose section 78. The outermost isolation layer 68C is joined to the inner hull structure 76. The isolation section 62 effectively breaks the energy transmission path from the propulsion system (not shown) of the underwater vehicle 72 to the array plate 52.

In one embodiment, the array plate 52, the isolation layers 68A, 68B and 68C and the intermediate layers 70A and 70B are generally annular in shape so as to be used in underwater vehicles having annular structural shells. However, it is to be understood that the array plate 52, the isolation layers 68A, 68B and 68C and the intermediate layers 70A and 70B can have other shapes as well.

As the underwater vehicle 72 travels to relatively deeper depths, the depth pressure applied to the nose section 78 increases. Such depth pressure is also applied to the apparatus 50. In certain situations, it may be desired to operate the underwater vehicle 72 at relatively shallow depths wherein the depth pressure applied to the nose section 78 is relatively less. Thus, the apparatus 50 is used in conjunction with interchangeable depth stop members that allow for variation or tuning of the resonance and frequency at which maximum isolation will occur.

As shown in FIG. 4, one such depth stop member is depth stop member 80. In one embodiment, the depth stop member 80 has a shape that matches the shape of the isolation section 62. Thus, if the isolation section 62 has an annular shape, then the depth stop member 80 also has an annular shape. The depth stop member 80 is joined to the inner hull structure 76 in such a position that the depth stop member 80 is proximate to the rear side 66 of the isolation section 62. The depth stop member 80 is configured to have a predetermined geometry that allows selected ones of the isolation layers 68A, 68B and 68C to flex in order to adjust the stiffness of the isolation section 62.

In accordance with the present invention, adjusting the stiffness of the isolation section 62 effects tuning of the particular resonance and frequency at which maximum isolation occurs. Thus, the present invention provides maximum isolation shallow depths. The degree of desired stiffness of the isolation section 62 depends upon the depth at which the underwater vehicle 72 operates. A lower degree of stiffness allows for desired isolation at shallow depths whereas a high degree of stiffness achieves the desired isolation at deep depths.

As shown in FIG. 4, the depth stop member 80 has the portion 82 and the portion 84 where the portion 82 is smaller in size than the portion 84; however, the portion 82 has a greater thickness than the portion 84. The difference in the thickness between the portions 82 and 84 provides gap 86 between the rear side 66 of the isolation section 62 and the depth stop member 80. The portion 82 of the depth stop member 80 has a predetermined size that does not extend over or abut any portion of the isolation section 62. However, the size of gap 82 is such that it extends over the isolation layers 68A, 68B and 68C and thus, the isolation layers 68A, 68B and 68C are allowed to flex. This reduces the stiffness of the array plate 52; thereby, providing maximum isolation at relatively shallow ocean depths. Thus, the particular geometry of the depth stop member 80 provides maximum isolation at a predetermined resonance and frequency, which correlates to a particular ocean or water depth. If there is an increase in the depth at which the underwater vehicle 72 operates, the depth stop member 80 can be replaced by another depth stop member having a different geometry which will increase the overall stiffness of the array plate 52 (See FIG. 5).

Figure 5:
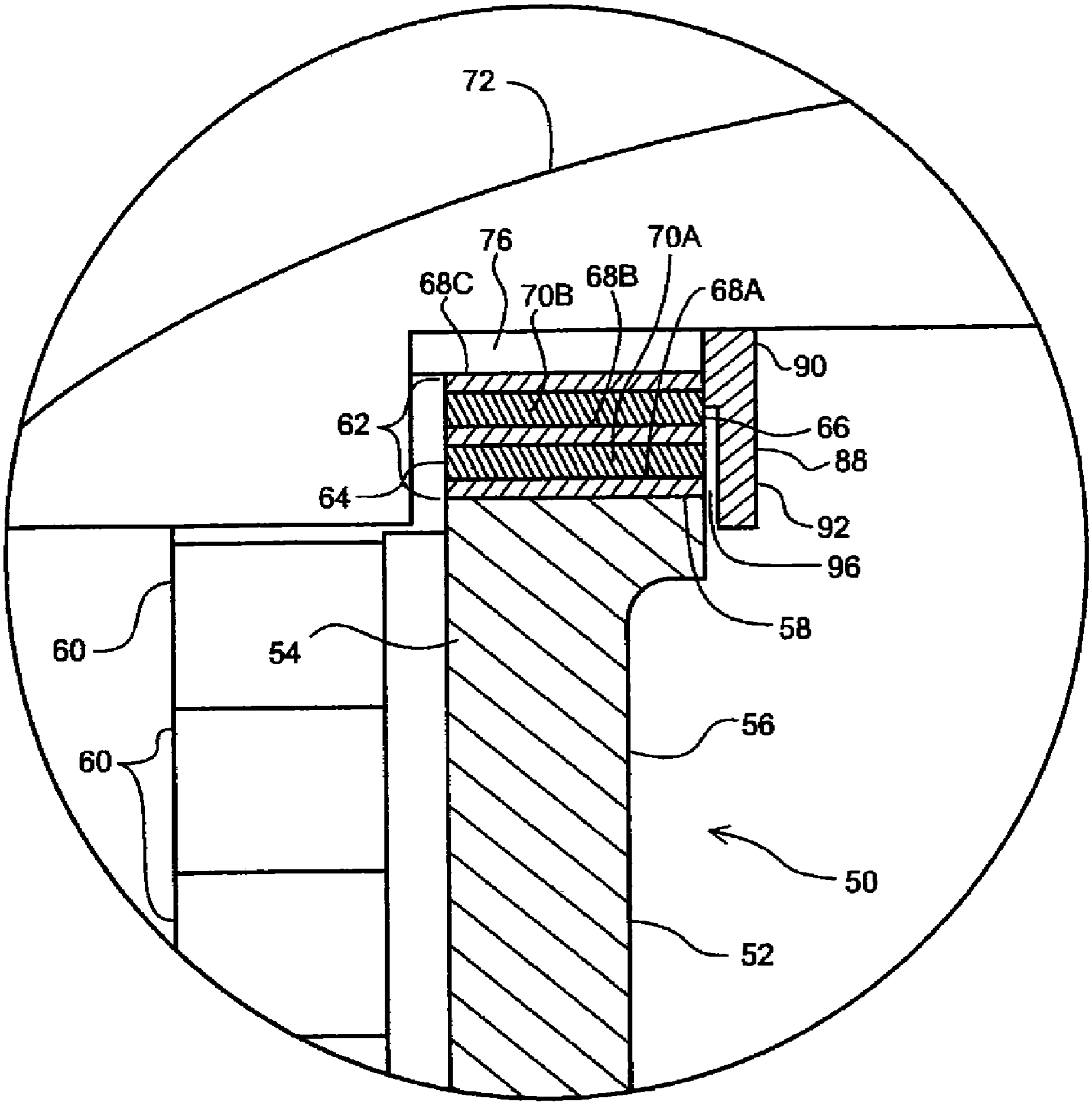
FIG. 5 is a view, basically the same as the view of FIG. 4, showing another depth stop member having a different geometry.

Referring now to FIG. 5, the depth stop member 80 is replaced by depth stop member 88. The depth stop member 88 comprises a portion 90 and a portion 92. The portion 90 has a thickness that is greater than the thickness of the portion 92, which results in a gap 96. However, in comparing the portion 90 of the depth stop member 88 to portion 82 of the depth stop member 80 (see FIG. 4), it can be seen that the portion 90 is greater in size than the portion 82. As a result, the portion 90 abuts the outermost isolation layer 68C and thus, reduces the ability of isolation layer 68C to flex. The gap 96 extends over the isolation layers 68A and 68B; thereby, allowing these isolation layers to flex. Thus, the depth stop member 88 changes the overall stiffness of the array plate 52, which causes a change in the resonance and frequency at which maximum isolation occurs.

Figure 6:
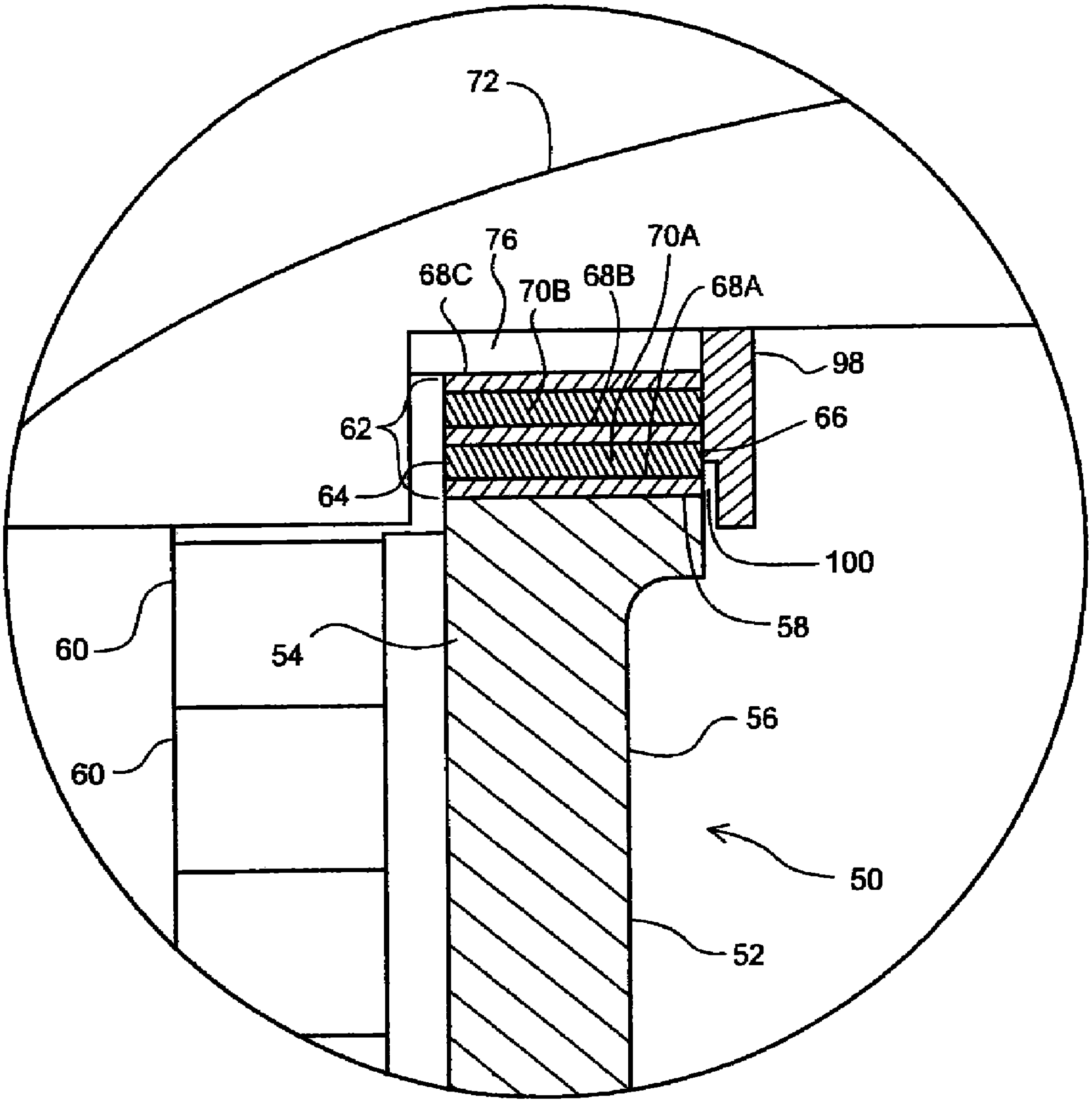
FIG. 6 is a view, basically the same as the view of FIG. 4, showing a still another depth stop member having a different geometry.

Similarly, the depth stop member 88 can be replaced by a depth stop member 98 (shown in FIG. 6). The depth stop member 98 has a different geometry than that of the depth stop member 88. The particular geometry of the depth stop member 98 provides a gap 100, which is smaller in size than that of the gap 96 (see FIG. 5) and gap 86 (see FIG. 4). The depth stop member 98 abuts the isolation layers 68B, 68C and intermediate layer 70B, but does not abut the innermost isolation layer 68A. The gap 100 extends over innermost the isolation layer 68A. The ability of the isolation layers 68B and 68C to flex is significantly reduced, but the isolation layer 68A is allowed to flex. This configuration results in further variation in the overall stiffness of the array plate 52 thereby producing a different resonance and corresponding frequency at which the maximum the isolation occurs. It is to be understood that the depth stop member 98 can be replaced by a different depth stop member that abuts all three isolation layers 68A, 68B and 68C to provide a higher degree of stiffness of the array plate 52.

Thus, the effective stiffness of the array plate 52 can be adjusted to provide a different resonance and corresponding frequency at which the maximum isolation occurs. This feature allows a relatively high degree of isolation from vehicle self-noise at shallow, moderate or deep depths. Furthermore, the use of the depth stop members allows the isolation layers 68A, 68B and 68C to be formed from very soft materials, which provide a relatively high degree of isolation of the acoustic transducers at shallow depths while still providing a high degree of isolation at relatively deeper depths.

The type of material used to fabricate the isolation layers 68A, 68B and 68C also can be altered to provide a particular resonance and frequency at which isolation will occur. Thus, a combination of changes in the geometry of the depth stop members 80, 88 and 98 and the materials used to fabricate the isolation layers 68A, 68B and 68C can achieve a desired resonance and frequency at which maximum isolation occurs. Thus, the isolation characteristics of the isolation section 62 can be tuned to a desired resonance and frequency to achieve maximum isolation.

Although the foregoing description and the drawings disclose the use of the three isolation layers 68A, 68B and 68C and the two intermediate layers 70A and 70B, it is to be understood that different quantities of isolation layers and intermediate layers can be used. For example, the number of isolation layers and intermediate layers can be increased to allow for more tunable design points.

Thus, the invention provides an apparatus that isolates the array plate from vehicle self-noise. The mechanical depth stop members allow for greater isolation at shallow depths while preserving deep depth operational capability. The present invention substantially improves the performance of acoustic transducers by reducing the noise floor associated with the operation of the acoustic transducers. The ability to adjust or tune the isolation section 62 provides a degree of flexibility in the operational characteristics of the invention.

The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed:

1. An apparatus for reducing the noise from a hull structure of an undersea vehicle, said apparatus comprising:
- an array plate having a perimetrical edge; and
- an isolation section joined to the perimetrical edge of said array plate, said isolation section having a plurality of isolation layers and a plurality of intermediate layers alternately arranged wherein an intermediate layer is positioned between consecutive isolation layers, said plurality of isolation layers comprising an innermost isolation layer that is joined to the perimetrical edge of said array plate and an outermost isolation layer for joining to the hull structure wherein the arrangement of said intermediate layers and said isolation layers reduces the noise from the hull structure at said array.

2. The apparatus according to claim 1 wherein each of said isolation layers is fabricated from a flexible and energy absorbing material.

3. The apparatus according to claim 2 wherein each of said isolation layers is fabricated from an elastomeric material.

4. The apparatus according to claim 1 wherein each of said intermediate layers is substantially rigid.

5. The apparatus according to claim 1 wherein said plurality of isolation layers comprises three isolation layers wherein consecutive layers of said isolation layers are separated by one of said intermediate layers.

6. The apparatus according to claim 1 wherein each of said isolation layers has an annular shape.

7. The array plate apparatus according to claim 1 wherein each of said intermediate layers has an annular shape.

8. The apparatus according to claim 1 wherein said array plate has a front side for attaching thereto acoustic transducers and said array plate has an opposite rear side.

9. The array plate apparatus according to claim 8 wherein said isolation section has a front side bordering said front side of the array plate and a rear side bordering the rear side of said array plate.

10. The apparatus according to claim 9 wherein said apparatus further comprising a depth stop member for mounting to the hull structure proximate to the rear side of said isolation section, said depth stop member having a predetermined geometry that allows selected ones of said isolation layers to flex.

11. An apparatus for reducing noise from a hull structure of an undersea vehicle comprising:

an annular array plate having a perimetrical edge; and an annular isolation section joined to the perimetrical edge of said annular array plate, said annular isolation section comprising of a plurality of isolation layers and a plurality of intermediate layers alternately arranged wherein one of said intermediate layers is positioned between consecutive isolation layers, each of said isolation layers being made from elastomeric material and each of said intermediate layers being made from a rigid material, said plurality of isolation layers having an innermost isolation layer that is joined to the perimetrical edge of said annular array plate and an outermost isolation layer for joining to the hull structure wherein the arrangement of said intermediate layers and said isolation layers reduces the noise from the hull structure at said array.

12. The apparatus according to claim 11 wherein said apparatus further comprising a depth stop member for mounting to the hull structure proximate to the rear side of said annular isolation section, said depth stop member having a predetermined geometry that allows selected ones of said isolation layers to flex.

* * * * *